(12) United States Patent
Somashekhar et al.

(10) Patent No.: US 7,006,536 B1
(45) Date of Patent: Feb. 28, 2006

(54) SYSTEM AND METHOD FOR TRANSPORTING MULTIPLE LOW-BIT-RATE SIGNALS OVER A SINGLE HIGH-BIT-RATE MEDIUM

(75) Inventors: Hosagrahar Somashekhar, Plano, TX (US); Gopalakrishnan Hari, Plano, TX (US)

(73) Assignee: Lighthouse Capital Partners IV, LP, Greenbrau, CA (US)

( * ) Notice: Subject to any disclaimer, the term of this patent is extended or adjusted under 35 U.S.C. 154(b) by 796 days.

(21) Appl. No.: 09/682,033

(22) Filed: Jul. 12, 2001

(51) Int. Cl.
*H04J 3/02* (2006.01)
*H04J 3/04* (2006.01)

(52) U.S. Cl. .................. 370/538; 370/540; 370/535

(58) Field of Classification Search ........ 370/535–538, 370/540, 542–544
See application file for complete search history.

(56) References Cited

U.S. PATENT DOCUMENTS

| | | | |
|---|---|---|---|
| 5,062,105 A * | 10/1991 | McKnight et al. .......... 370/538 |
| 6,457,080 B1 * | 9/2002 | Sherman et al. ............ 710/305 |
| 6,616,350 B1 * | 9/2003 | de Boer et al. ................ 398/9 |
| 6,822,975 B1 * | 11/2004 | Antosik et al. ............. 370/538 |

* cited by examiner

*Primary Examiner*—Chi Pham
*Assistant Examiner*—Ronald Abelson
(74) *Attorney, Agent, or Firm*—Sprinkle IP Law Group

(57) ABSTRACT

Systems and methods for conveying multiple low-bit-rate data streams over a data transport medium which is configured to transport data in a single, high-bit-rate data stream. In one embodiment, a plurality of low-bit-rate signals are received and a corresponding data rate is determined. Each of the signals is formatted in frames comprising a payload and overhead data. The high-bit-rate signal is also formatted in frames comprising a payload and overhead data, but the frames (including payload and overhead) contain more bits than those of the low-bit-rate frames. The payloads of the low-bit-rate frames are mapped into the payloads of the high-bit-rate frames. The overhead and timing data of the low-bit-rate frames are mapped into the unused portion of the overhead of the high-bit-rate frames. After the high-bit-rate signal is transported, the payload, overhead and timing data of each of the low-bit-rate signals is extracted, and the corresponding signals are reproduced.

8 Claims, 12 Drawing Sheets

SYSTEM AND METHOD FOR TRANSPORTING MULTIPLE LOW-BIT-RATE SIGNALS OVER A SINGLE HIGH-BIT-RATE MEDIUM

BACKGROUND OF INVENTION

1. Field of the Invention

The invention relates generally to systems and methods for transporting data and more particularly to systems and methods for conveying multiple low-bit-rate data streams over a data transport medium which is configured to transport data in a single, high-bit-rate data stream.

2. Background of the Invention

With the increasing computing power that is available for both commercial and private use, there is an increased demand for data transfer on a number of levels. Particularly, the emergence of the Internet and the ability of businesses and individuals to easily communicate with others around the world has created a need for greater speed, quality and capacity than ever before.

One response to the demand for increased performance in data transfers has been the development of optical data transfer systems. These systems use light instead of electrical signals to carry data from one point to another. Optical data transfer systems typically have much greater bandwidth than electrical systems of comparable size and cost, and are capable of providing higher quality signals for data transmission.

While optical data transfer systems provide advantages over electrical systems, they may also suffer from some drawbacks which may be found in any other rapidly developing technologies. Incremental advances in a technology may cause some previously developed hardware to become obsolete, or at least to have performance which is less than the greatest possible performance. Since it may nevertheless be cost-effective to implement a system using the out-of-date hardware, it is often necessary to enable the more advanced hardware to operate cooperatively with older hardware.

For example, a user may have a system which implements low-bit-rate data transfer paths, but may wish to utilize hardware which implements a high-bit-rate data transfer path. While the high-bit-rate data transfer path may be capable of handling low-bit-rate data transfers, this may leave a great deal of the available bandwidth unused. The user will have to pay for this bandwidth, whether it is used or not, so the incorporation of the more advanced technology may be impractical.

It would therefore be desirable to provide a means for making greater use of the hardware incorporating the advanced technology. Particularly, it would be desirable to provide a means for utilizing all of the bandwidth of high-bit-rate data transfer hardware when it is used in connection with equipment designed to transfer data at low bit rates.

Another problem is that systems which are currently available for optical-electrical conversion, transport and re-conversion may not be suitable for the needs of all users. These systems are typically designed to receive frames of data in a known format (e.g., SONET,) strip away the frame information, transport the data payload, add new frame information and deliver the newly framed data. While this is acceptable to some users, other users may desire a means for transporting an unaltered optical data stream from one point to another. That is, it may be desirable to maintain the proper bit sequence (the order of the bits within the data stream) as well as the rate at which the bits occur within the data stream. This may be true for a number of reasons. For example, the data stream may not be formatted according to the appropriate framing scheme, or it may be important to maintain the timing of the data between the transmitting and receiving devices. It is therefore desirable to provide a means for performing the conversion and transport of the data in a manner which is transparent to the user (i.e., it functions as a virtual fiber.)

SUMMARY OF INVENTION

One or more of the problems outlined above may be solved by the various embodiments of the invention. Broadly speaking, the invention comprises systems and methods for conveying multiple low-bit-rate data streams over a data transport medium which is configured to transport data in a single, high-bit-rate data stream.

One embodiment of the present invention comprises a method for combining a plurality of low-bit-rate signals into a single high-bit-rate signal, transporting the high-bit-rate signal, and then reconstructing the low-bit-rate signals. The low-bit-rate signals may, for example, comprise OC-48 SONET optical data signals. (It should be noted that the low-bit-rate signals may be any appropriate combination of that could be combined into an OC-192 signal, e.g., 16 OC-3s, 4 OC-12s and 2 OC-48s.) These optical signals are converted into electrical signals for processing. The processing consists of determining a data rate for each of the signals (e.g., by counting the number of bits per time interval) and combining the data for each of the signals into a format suitable for transmission over a high-bit-rate data line. The data is combined by mapping the payloads of each of the low-bit-rate signals to the payload of the high-bit-rate signal, mapping the overhead data of each of the low-bit-rate signals to an unused portion of the overhead data of the high-bit-rate signal, and mapping the timing data (e.g., data rate) of each of the low-bit-rate signals to the unused portion of the overhead data of the high-bit-rate signal. In this embodiment, the combined data is embodied in an electrical signal which is converted into an optical signal (e.g., an OC-192 SONET signal) and transmitted over an optical transmission medium. The high-bit-rate signal is received and converted from an optical signal back into an electrical signal. The payload, overhead data and timing data for each of the low-bit-rate signals is then extracted from the high-bit-rate electrical signal. The payload and overhead data corresponding to each low-bit-rate signal is combined to form the data stream of a corresponding low-bit-rate output signal. This data stream is output at a rate which is controlled by the corresponding timing data to match the data rate of the low-bit-rate input signal. In one embodiment, this is accomplished by comparing the data rates of the low-bit-rate input and output signals and adjusting the output data rates until the input and output rates match. The low-bit-rate signals which are output are therefore substantially identical to the low-bit-rate input signals, and the transmission of the data as a high-bit-rate signal is transparent to the users of the low-bit-rate signals.

Another embodiment of the present invention comprises a system configured to receive a plurality of low-bit-rate data signals, combine these signals for transmission over a single, high-bit-rate transmission medium, and reproduce the original signals for delivery to their respective destinations. In one embodiment, the system comprises a multiplexer and a demultiplexer which are coupled together by a high-bit-rate data line. The multiplexer includes a plurality of ingress modules, each of which is configured to receive a corresponding one of the low-bit-rate data signals. Each ingress module is configured to convert the signal into an electrical form if necessary, generate timing information for the signal, and buffer the data stream of the signal for incorporation into a high-bit-rate signal. In one embodiment, the ingress module includes a counter configured to counter the bits of the data stream and a timer configured to measure predetermined intervals of time. Combined, these pieces of information provide the data rate of the low-bit-rate signal. The multiplexer is configured in one embodiment to combine the data of each of the low-bit-rate data signals by inserting the corresponding payload data into the payload of the high-bit-rate data signal, inserting the corresponding overhead data into an unused portion of the overhead of the high-bit-rate data signal, and inserting the corresponding timing information into the unused portion of the overhead of the high-bit-rate data signal. The system is configured to transmit the resulting data stream over the high-bit-rate data line to the demultiplexer. The data stream may be transmitted as an electrical signal, or it may be converted into an optical signal, depending upon the transmission medium. The demultiplexer is configured to extract the payload, overhead and timing information corresponding to each of the low-bit-rate signals from the high-bit-rate data stream and to deliver this data to a corresponding egress module. The egress module is configured to reconstruct the data stream of the corresponding low-bit-rate signal using the payload and overhead data and to buffer the data stream until it is output from the egress module. The data is read out of the buffer at a rate which is determined by a phase locked loop (PLL) controlled by the corresponding timing information. In one embodiment, this is accomplished by providing in each egress module a counter and timer similar to those of the ingress modules. The counter is used to count the bits of data as they are read out of the buffer while the timer measures intervals identical to those of the ingress module timers. The output data rate determined from these pieces of information is compared to the input data rate which is extracted from the high-bit-rate signal. If the output data rate is slower than the input data rate, the PLL frequency is increased and, if it is faster, the PLL frequency is decreased.

The embodiments described above are exemplary, and numerous alternative embodiments are possible.

BRIEF DESCRIPTION OF DRAWINGS

Other objects and advantages of the invention may become apparent upon reading the following detailed description and upon reference to the accompanying drawings in which.

Figure 1:
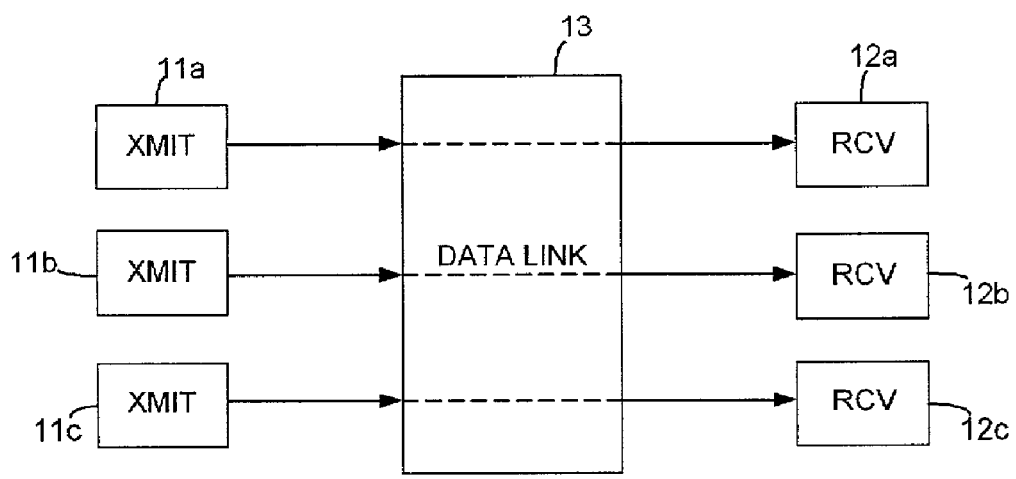
FIG. 1 is a diagram illustrating the transmission of the plurality of optical data streams is shown from the perspective of the owner of the datastream.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for conveying multiple low-bit-rate data streams over a data transport medium which is configured to transport data in a single, high-bit-rate data stream. The low-bit-rate data streams may be transported with their respective payloads, overhead data and timing intact, or they may be transported with modified overhead information, as is conventional. Combinations of these alternatives may also be possible. Payloads of the low-bit-rate data signals are mapped to the payload of the high-bit-rate data signal. Overhead data for the low-bit-rate data signals is mapped to the unused portion of the overhead data in the high-bit-rate signal. Timing for each of the low-bit-rate data signals is also mapped to the unused portion of the overhead data in the high-bit-rate signal. In one embodiment, timing data is determined for the low-bit-rate data signals by counting the number of data bits received in a predetermined interval. This data is compared to the number of data bits output in an equivalent interval, and the output bit rate is adjusted to minimize the difference.

Referring to FIG. 1, a diagram illustrating the transmission of the plurality of optical data streams is shown from the perspective of the owner of the datastream (i.e., the user who wishes to transmit the data.) In this figure, each datastream is shown being conveyed from a first, transmitting device 11 to a second, receiving device 12. Each data stream is conveyed from transmitting device 11 to receiving device 12 via a data link 13. Each datastream may be conveyed in one of two modes. In the first mode, the transport mechanism used by data link 13 is transparent. In other words, the datastream which is output from data link 13 is substantially identical to the corresponding datastream which is input to the data link—not only the bit sequence, but also be timing of the input and output data streams match. Because the datastream is essentially unaltered from input to the output in this mode, data link 13 serves in this mode as what may be referred to as a "virtual fiber" over which the datastream is transported. In the second mode, the data stream is transported conventionally. In this mode, the overhead data associated with the data payload is stripped away, the data is transported, and then new overhead data is appended to the data payload. The output data stream therefore contains the same data payload as the input data stream, but different overhead data, so the bit sequences of the two data streams are different. The timing of the data streams may also be different.

It should be noted that, for the purposes of this disclosure, identical items in the figures may be indicated by identical reference numerals followed by a lowercase letter, e.g., 12a, 12b, and so on. The items may be collectively referred to herein simply by the reference numeral.

Figure 2:
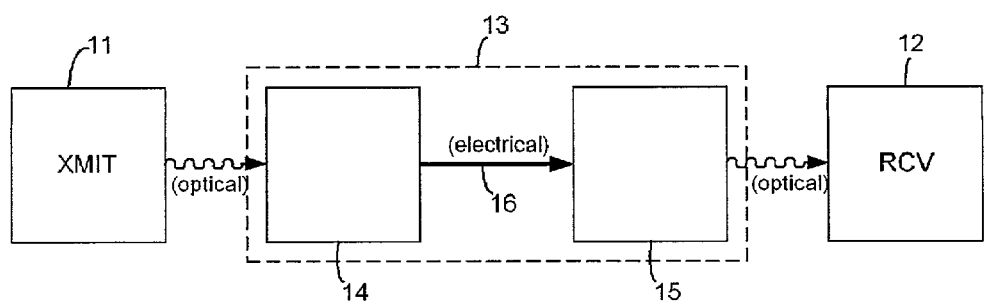
FIG. 2 is a diagram illustrating the transmission of an optical data stream from one of the transmitting devices to one of the receiving devices is shown from the perspective of the data link.

Referring to FIG. 2, a diagram illustrating the transmission of an optical data stream from one of the transmitting devices to one of the receiving devices is shown from the perspective of the data link. In this figure, it can be seen that transmitting device 11a produces an optical data stream which is delivered to data link 13 at a first point. Data link 13 converts the optical data stream to an electrical data stream, conveys the electrical data stream to a second point, converts the electrical data stream back into an optical data stream, and delivers the optical data stream to receiving device 12a.

In the embodiment of FIG. 2, the portion of data link 13 coupling transmitting device 11a to receiving device 12a is depicted as comprising a first component 14, a second component 15 and an electrical transmission medium 16 which couples the first and second components together. First component 14 is configured to receive the optical data stream from transmitting device 11 and to convert the optical data stream into an electrical data stream. The electrical data stream is then transmitted over data transport medium 16 to second component 15, which converts it back into an optical signal for delivery to receiving device 12a. Although data transport medium 16 is depicted as a simple connection between component 14 and 15, it should be noted that it need not be a mere signal line, and may instead comprise a complex switching and routing system. In such a case, it is likely that component 15, which is configured to receive the electrical signal and convert it back into an optical signal, may be one of many possible destination devices to which the data stream may be routed. Further, the data stream and need not be maintained only as an electrical signal during transport by data transport medium 16—the data transport medium may incorporate a combination of components which may transport data in a variety of forms (e.g., as both electrical and optical data.) For instance, first component 14 may convert the optical signal to an electrical signal, process the electrical signal, convert the electrical signal into an optical signal, and then transmit the optical signal over data transport medium 16 to second component 15. Data transport medium 16 should therefore be broadly viewed as comprising any medium or means for transporting data from one point to another.

Figure 3A:
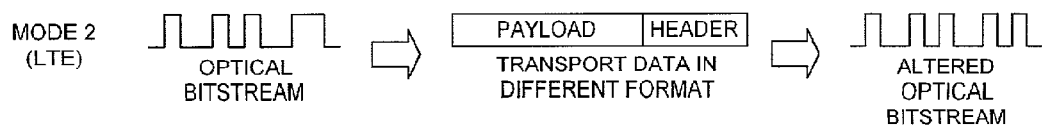
FIGS. 3A and 3B are a pair of diagrams illustrating the form of a data stream as it is transported from a transmitting device to a receiving device in accordance with alternate modes of one embodiment.
Figure 3B:
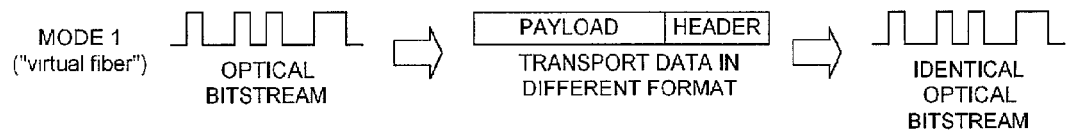

Referring to FIGS. 3A and 3B, a pair of diagrams illustrating the form of a data stream as it is transported from a transmitting device to a receiving device in accordance with alternate modes of one embodiment of the present invention is shown. In FIG. 3A, a conventional mode for transmission of the data is shown. This mode may be referred to as a line terminating equipment, or LTE mode. In this figure, the optical data stream produced by the transmitting device is depicted as a signal 21 comprising a square wave. Optical signal 21 comprises pulses of light which correspond to the binary 1's of the data stream. (Other embodiments may employ different signals.) The pulses are clocked at a particular rate which is characteristic of the input signal. After the optical signal is converted into an electrical signal, the corresponding data can be easily manipulated. For example, the data can be stored as a number of corresponding bits in a buffer. These bits can be formatted in packets 22 (or frames, or some other manner of formatting) for transport over an electrical transmission medium. If data stream data is formatted into a packet, the data may form the payload 24 of the packet and may be accompanied by overhead information such as a packet header 25. When the packet is converted back into an optical signal, new overhead information is added to the data payload. The output optical signal therefore comprises an altered sequence of bits, as compared with the original input signal. When the data is transmitted in this manner, the clocking information which was inherent in the original optical signal is lost, so the timing of the output signal may also be altered, as compared with the input signal.

Referring to FIG. 3B, another mode for transmission of the data is shown. This mode may be referred to as a virtual fiber mode, because, in this mode, the system can be said to emulate a fiber. In other words, the system simply passes the optical data stream without significantly affecting it. The input and output data streams are substantially identical in this mode. That is, they are identical within the tolerances of the normal transmission protocol. In FIG. 3B, the optical data stream produced by the transmitting device is again a square wave 21 which correspond to the binary 1's of the data stream. The optical signal is converted into an electrical signal and processed for transport (e.g., formatted in packets 22.) The packets are transported over an electrical transmission medium and converted back into an optical signal. In this mode, however, the optical signal is reconstructed with the same sequence of bits as the input signal. The data is clocked out at a frequency which matches that of the input signal so that the output signal is substantially identical to the input signal.

Figure 4:
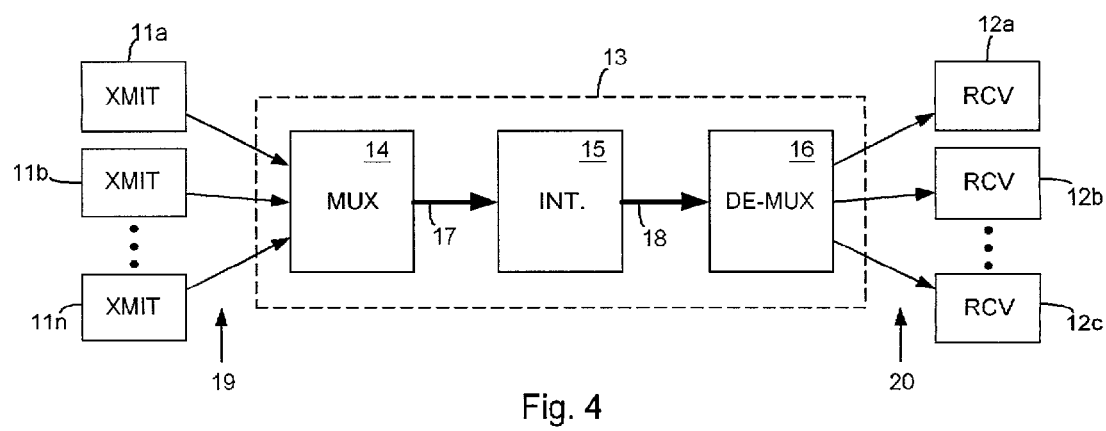
FIG. 4 is a diagram illustrating one embodiment of the present system.

Referring to FIG. 4, a diagram illustrating one embodiment of the present system is shown. In this system, a plurality of transmitting devices 11 are configured to produce data streams at low bit rates. Each of the data streams is destined for a corresponding receiving device 12. In this particular embodiment, each of the data streams is directed from one of transmitting devices 11 to a unique one of receiving devices 12. It is desired in this instance to have system 13 transmit the data streams between each pair of transmitting and receiving devices as if they were connected by a dedicated medium (e.g., optical fiber.) In this mode of transmission, the system can be referred to as providing a virtual fiber between each pair of transmitting and receiving devices. System 13 is configured to combine each of the low-bit-rate data streams produced by transmitting devices 11 into a single high-bit-rate data stream which is transported through the system and then used to reconstruct the individual low-bit-rate data streams for delivery to receiving devices 12.

In the embodiment of FIG. 4, system 13 comprises three primary components: multiplexer 14; intermediate component 15; and demultiplexer 16. Multiplexer 14 is configured to receive the low-bit-rate data streams from each of the transmitting devices 11 via low-bit-rate data lines 19, and to multiplex the data into a single high-bit-rate data stream. Demultiplexer 16 is configured to receive the high-bit-rate data stream and to demultiplex it into replicas of the original low-bit-rate data streams. These data streams are delivered to receiving devices 12 via low-bit-rate data lines 20. Intermediate component 15 is not essential to the functioning of the system, but is instead depicted here to exemplify the potential complexity of the transmission path between multiplexer 14 and demultiplexer 16. Intermediate component 15 may be replaced by any suitable transport medium (e.g., a switching matrix, optical data network or other data transport system.) Here, intermediate component 15 is coupled to multiplexer 14 and demultiplexer 16 by high-bit-rate server spans (data lines) 17 and 18, respectively, and is simply configured to forward the high-bit-rate data stream from the multiplexer to the demultiplexer.

Figure 5:
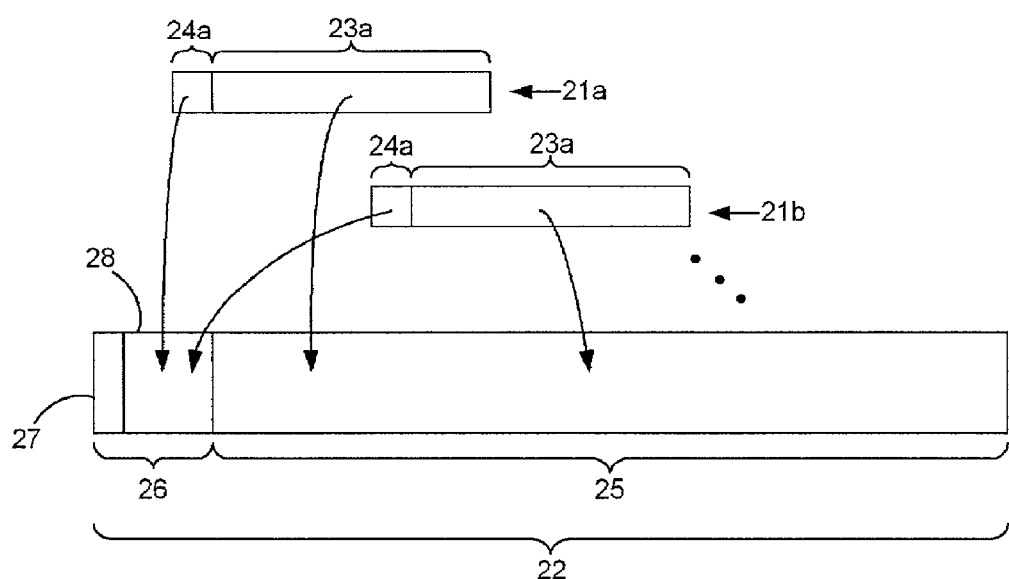
FIG. 5 is a diagram illustrating the manner in which multiple low-bit-rate data streams are multiplexed into a single high-bit-rate data stream in one embodiment.

Referring to FIG. 5, a diagram illustrating the manner in which multiple low-bit-rate data streams are multiplexed into a single high-bit-rate data stream in one embodiment is shown. The low-bit-rate data streams may be formatted, for example, as SONET optical signals. SONET signals are formatted as frames of data 21. (Frame 21a in this figure represents a frame of data from a first data stream, while frame 21b represents data from a second data stream.) Each frame comprises a payload 23, which carries the useful data between the devices, and overhead data 24, which is used in the transport of the SONET frames. The high-bit-rate data signal in this example is also formatted as a SONET optical signal which comprises frames 22. Frame 22, like frames 21, includes a payload 25 and overhead data 26. A first portion 27 of overhead data 26 is actually used to store overhead data associated with the transport of high-bit-rate frame 22, while a second portion 28 of overhead data 26 is unused in the transport of frame 22. Portion 28 of overhead data 26 is instead used to store overhead and timing information associated with the low-bit-rate frames as described below.

As illustrated in FIG. 5, payloads 23 of the low-bit-rate frames 21 are encapsulated in payload 25 of high-bit-rate frame 22. Overhead data 24 from each of the low-bit-rate frames 21 is stored in the unused portion 28 of the overhead data of high-bit-rate frame 22. Although not shown explicitly in the figure, timing data associated with each of the low-bit-rate data streams is also stored in the unused portion 28 of the overhead data of high-bit-rate frame 22. The nature of the timing data and the manner in which it is used will be explained in more detail below.

While only two low-bit-rate frames 21 are shown in FIG. 5, it should be noted that the number of low-bit-rate data streams which can be mapped to the high-bit-rate data stream is determined by their corresponding data rates. For example, if each of the low-bit-rate data streams comprise OC-48 SONET signals (which carry 2.5 gigabits of data per second) and the high-bit-rate data stream comprises an OC-192 SONET signal (which carries 10 gigabits of data per second,) four of the low-bit-rate signals can be multiplexed into the high-bit-rate signal. In any instance, the payloads of the low-bit-rate signals will still be mapped to the payload of the high-bit-rate signal, while the overhead and timing data of the low-bit-rate signals will be mapped to the unused portion of the overhead of the high-bit-rate signal.

Figure 6A:
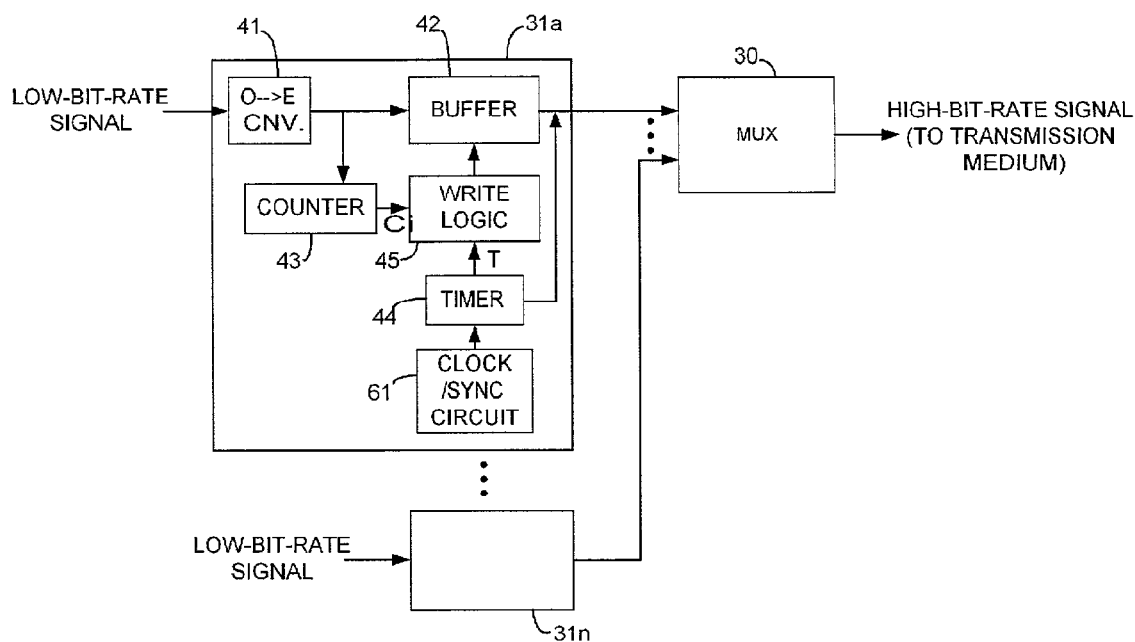
FIGS. 6A and 6B are a pair of diagrams illustrating an exemplary embodiment of a system for transporting a plurality of low-bit-rate optical data streams via a single high-bit-rate signal.
Figure 6B:
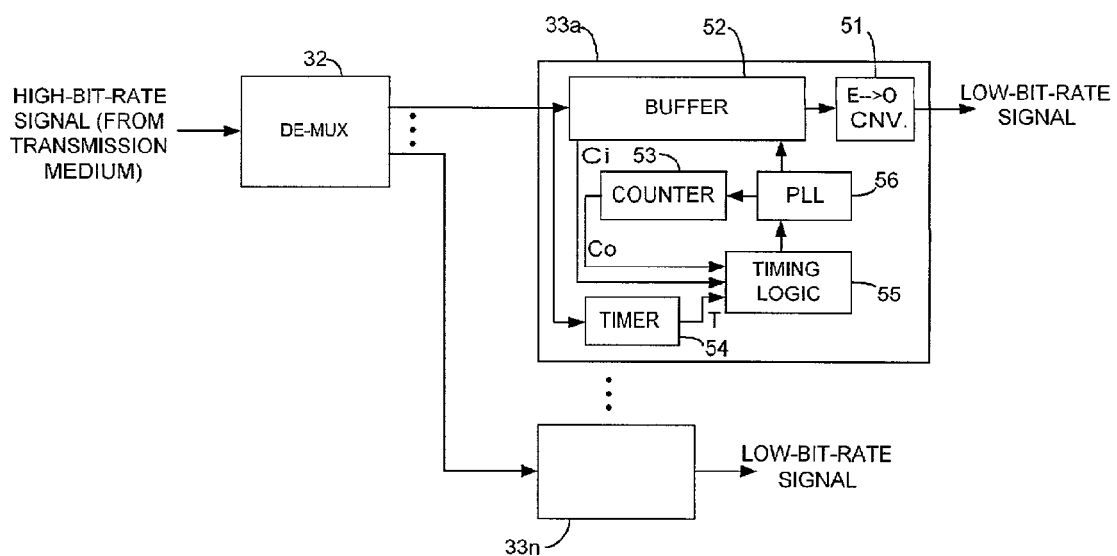

Referring to FIGS. 6A and 6B, a pair of diagrams illustrating an exemplary embodiment of a system for transporting a plurality of low-bit-rate optical data streams via a single high-bit-rate signal is shown. In this embodiment, timing data associated with each of the low-bit-rate data signals is conveyed with the associated data so that the timing of the respective data streams can be reconstructed after the data is transported. The system thus appears as a set of virtual fibers to the transmitting and receiving devices.

The system comprises three primary groups of components: the ingress components (including ingress modules 31 and multiplexer 30); the transmission medium; and the egress components (including demultiplexer 32 and egress modules 33. The transmission medium corresponds generally to transmission medium 16 of FIG. 4. The ingress components collectively correspond to component 14 of FIG. 4 and the egress components collectively correspond to component 16 of FIG. 4.

It should be noted that the embodiment of the present system which is depicted in FIGS. 6A and 6B utilizes an electrical transmission medium to transport the data from the ingress module to the egress module. The electrical transmission medium may, for example, comprise an electrical switching matrix. In other embodiments, the transport medium may comprise other means for transporting the data, such as an unswitched electrical medium, or a hybrid electrical-optical medium (e.g., a switching network which converts an electrical signal into an optical signal which is transported over an optical medium and then converted back into an electrical signal for processing prior to delivery to the egress module.) The functions of the system may also be partitioned among the components in a different manner in other embodiments. For example, if it is necessary to convert a signal from an electrical form into an optical form, or vice versa, this function may be implemented in the ingress and egress modules, or in the inputs/outputs of the transmission medium.

In the embodiment of FIGS. 6A and 6B, each of the low-bit-rate optical data streams is received by a corresponding one of ingress modules 31. The datastream is processed by ingress module 31 and forwarded to multiplexer 30. Multiplexer 30 combines the data with that of the other data streams, mapping the low-bit-rate data payloads into the high-bit-rate data payload, and mapping the overhead and timing information of the low-bit-rate signals into the unused portion of the overhead of the high-bit-rate signal. The high-bit-rate signal is transmitted by multiplexer 30 over the high-bit-rate transmission medium to demultiplexer 32. The demultiplexer 32 extracts the data for each of the low-bit-rate data streams from the high-bit-rate datastream and forwards the data for each of the low-bit-rate data streams (including the payload, overhead and timing information) to a corresponding one of the egress modules 33. Egress module 33 then reconstructs the original low-bit-rate datastream from the payload, overhead and timing information. (That is, it generates a data stream which has a bit sequence and timing which are essentially identical to those of the data stream that was input to the corresponding ingress module.)

Each of the low-bit-rate data signals will be transmitted through one of ingress modules 31 and a corresponding one of egress modules 33. Because each of the low-bit-rate data streams will be handled in the same manner by the corresponding portions of the system, the components and operation of the system will be described with respect to a single data path comprising one of ingress modules 31, multiplexer 30, the high-bit-rate transmission medium, demultiplexer 32 and one of egress modules 33. While the detail of only one of ingress modules 31 is shown, it should be noted that the other address modules are identically configured. The same is true of egress modules 32.

Referring to FIG. 6A, ingress module 31 comprises an optical-to-electrical (o-e) converter 41, a buffer 42, a counter 43, a timer 44 and write logic 45. An optical signal is received by o-e converter 41 and is converted into an electrical signal. The bit sequence and timing of the electrical signal are identical to those of the optical signal. O-e converter 41 (as well as e-o converter 51) may implement a conventional design for this conversion. Because such designs are well known, the structure of the converter will not be described in further detail in this disclosure. The electrical signal generated by o-e converter 41 is forwarded to buffer 42, which is configured to store the data bits represented by the signal. The data is stored in buffer 42 until it can be transported to egress module 33. The electrical signal generated by o-e converter 41 is also transmitted to counter 43. Counter 43 is configured to provide to write logic 45 a count of the number of bits of the data stream which are received by buffer 42. Write logic 45 is also configured to receive a timing signal from timer 44. Based upon the count information received from counter 43 and the timing information received from timer 44, write logic 45 is configured to determine the number of bits which are received by buffer 42 in a given time period.

Since it is assumed that o-e converter 41 converts the optical data stream into an electrical data stream in real-time, the rate at which bits are received by buffer 42 is the same as the bit rate of the optical data stream. Consequently, the number of the data bits received by the buffer (as indicated by the count received from counter 43) during the interval signaled by timer 44 corresponds to the data rate of the input optical stream. This information is conveyed with the data bits from ingress module 31 to egress module 33 so that the correct timing can be generated for the optical data stream produced by e-o converter 51. The timing information is conveyed by inserting the bit count (Ci) corresponding to time interval (T) in buffer 42. Thus, the bit count becomes part of the data stream which is transmitted from ingress module 31 to egress module 33.

The data which is stored in buffer 42 (including the bits of the original data stream and the periodic bit count, Ci) is read out of the buffer and transmitted to multiplexer 30, which combines the data with that of other data streams and formats it as necessary for transmission over the transport medium (e.g., it may be formatted into packets or frames with corresponding header or frame overhead data.) The transport medium delivers the data to demultiplexer 32, which is configured to extract the data corresponding to each low-bit-rate data stream and deliver it to buffer 52 of the associated egress module 33.

The transport medium may comprise any type of switching system, network or other medium for transmitting data from one point to another. This may include complex systems of interconnected switches or other routing devices, and also to simple transmission media, such as a direct, hard-wired connection between the ingress and egress modules.

Referring to FIG. 6B, the data which is transmitted through the transport medium and demultiplexer 32 is received by buffer 52 of the egress module. Egress module 33 comprises an electrical-to-optical (e-o) converter 51, a buffer 52, a counter 53, a timer 54, timing logic 55 and phase locked loop (PLL) 56. As the data is received, it is reformatted (or unformatted) if necessary and stored in buffer 52. The bit count Ci, which was inserted into the data stream by ingress module 31, is extracted from the data stream and forwarded to timing logic 55. The bit count may be read out of the data stream so that it is not stored in buffer 52, or it may be stored in the buffer and then read out (and removed from the data stream) prior to forwarding the data stream to e-o converter 51.

Buffer 52 is configured so that data is read out of the buffer at a rate which is controlled by phase locked loop (PLL) 56. PLL 56 is coupled to receive control data from timing logic 55, which is in turn coupled to buffer 52 and counter 53 to receive the input bit count, Ci (which was embedded in the data stream received from ingress module 31,) and the output bit count, Co (which is generated by counter 53.) Timing logic 55 is also coupled to timer 54, which is configured to produce a timing signal to indicate intervals T over which output bit count Co is determined. The interval T which is measured by timer 54 is identical to the interval T which is measured by timer 44 (which is the reason for running both timers based upon the same clock and synchronization signals.) The purpose of providing the input and output bit counts to timing logic 55 is to allow these counts to be compared and to enable timing logic 55 to adjust PLL 56 so that the input and output bit counts are the same.

Timing logic 55 is configured to determine the difference between input bit count Ci and output bit count Co. If the input bit count is greater then the output bit count, timing logic 55 increases the frequency of PLL 56 in order to increase the next output bit count. If the input bit count is less than the output bit count, timing logic 55 decreases the frequency of PLL 56 in order to decrease the next output bit count. By matching the input and output bit counts over identical intervals, timing logic 55 and PLL 56 cause the timing information of the original data stream to be reproduced in the output data stream. Once the bit counts have been equalized, it is contemplated that there will be little, if any, need to further adjust the frequency of the PLL. Nevertheless, the comparison is continued in this embodiment in case the need for adjustment arises.

It should be noted that o-e converter 41 and e-o converter 51 operate in real-time. Consequently, the timing of the optical and electrical signals is identical. The input and output data streams match (in the virtual fiber mode) whether the pair of electrical data streams or the pair of optical data streams are considered. Since both the bit sequence and timing of the data stream are maintained between the input and output data streams, they are essentially indistinguishable, and the transmission through the data link between 30 and 32 is essentially transparent.

In the embodiment described above, the clock/sync signals upon which the operation of timers and 44 and 54 are based is provided by clock/sync circuit 61. In this embodiment, ingress module 31 serves as a master with respect to timing, while egress module 33 is slaved to the clock signal which it receives from ingress module 31. The clock/sync signals are embodied in the transmitted signal (i.e., in the signal transmitted from the ingress module to the multiplexer and consequently in the signals transmitted from the multiplexer to the demultiplexer and from the demultiplexer to the egress module.) This is generally referred to as line timing. It should be noted that the timing for the components of this system may be provided through various alternative means. For example, a single clock could be used to provide timing signals to each of the ingress modules, rather than having a separate clock/sync circuit for each. In another embodiment, a single external clock could be used to provide timing signals, not only to the ingress modules, but to the egress modules as well.

It should be noted that the embodiment described above in regard to FIGS. 6A and 6B is configured to transport optical signals. More specifically, it is configured to accept a signal in optical form, convert it to electrical form, process and route the data embodied in the signal (possibly in a combination of electrical and optical forms,) and deliver a substantially identical optical signal to a destination device. Other embodiments may be configured to transport electrical signals (i.e., receive and deliver signals in electrical form.) One such embodiment could be as described above, except that the optical-to-electrical converter in the ingress module and the electrical-to-optical converter in the egress module would not be necessary.

The foregoing embodiment is configured to appear as a virtual fiber to the transmitting and receiving devices between which the low-bit-rate data signals are transferred. As indicated above, however, it is not necessary that the system be configured to transmit data only in a virtual fiber mode. Some embodiments may be configured to transport data into a conventional mode as well as the virtual fiber mode. Thus, some embodiments may have one or more virtual fiber datapaths which are configured to provide output signals which are substantially identical to the corresponding input signals, and one or more conventional data paths which are configured to deliver the payload of the corresponding datastream in a bit sequence or format which is not necessarily identical to that of the corresponding original datastream. Still other embodiments may have channels which are switchable between conventional and virtual fiber modes.

Figure 7:
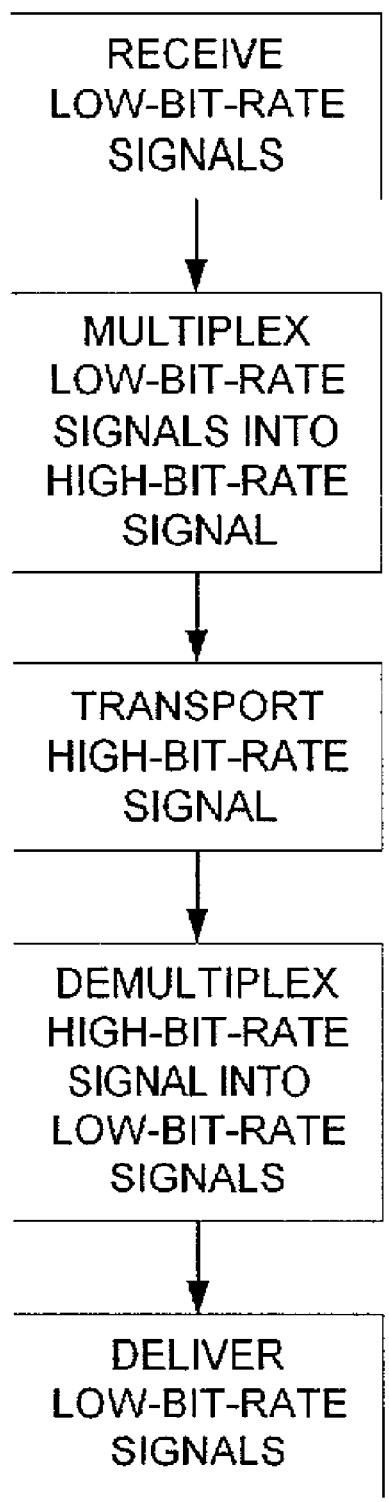
FIG. 7 is a flow diagram which provides an overview of a method in accordance with one embodiment.

Referring to FIG. 7, a flow diagram which provides an overview of one embodiment of a method in accordance with the present disclosure is shown. In this embodiment, the method comprises receiving multiple low-bit-rate signals, multiplexing the multiple low-bit-rate signals into a single high-bit-rate signal, transporting the high-bit-rate signal, demultiplexing the high-bit-rate signal into multiple low-bit-rate signals, and delivering the low-bit-rate signals to the appropriate destination devices. Flow diagrams illustrating this method in more detail are shown in FIGS. 8–10.

Figure 8:
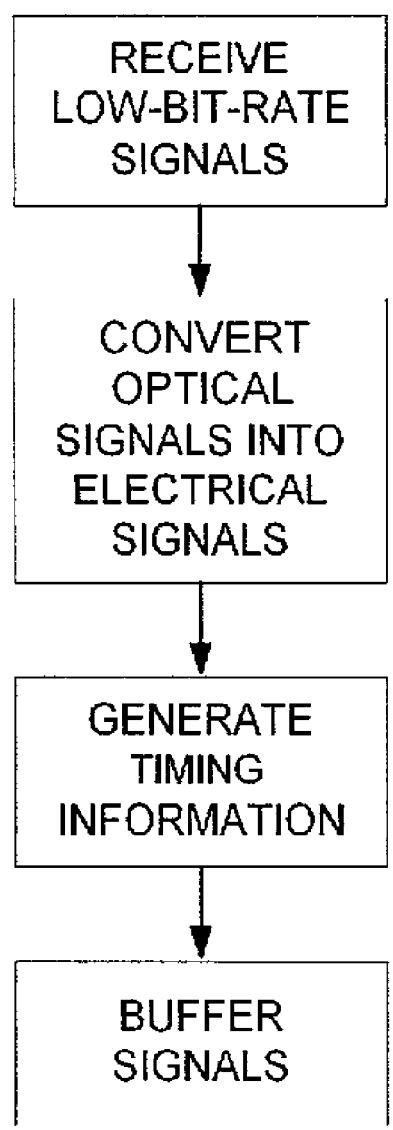
FIG. 8 is a flow diagram illustrating the manner in which multiple low-bit-rate optical data streams are handled when they are received in one embodiment.

Referring to FIG. 8, a flow diagram illustrating the manner in which multiple low-bit-rate optical data streams are handled when they are received in one embodiment is shown. Each of the low-bit-rate optical signals is received and then converted into a corresponding electrical signal. The conversion of the optical datastream into an electrical datastream can be performed using conventional methods which are known in the optical-electrical data processing arts. The electrical signal is processed to generate timing information. (The generation of the timing information is described in more detail below in connection with FIGS. 11A and 11B.) After the timing information is generated, the electrical signals are stored in a buffer until they are multiplexed into the high-bit-rate signal. The timing information can be stored in the buffer with the rest of the signal data, or it may be stored separately until it is inserted into the high-bit-rate data signal.

Figure 9:
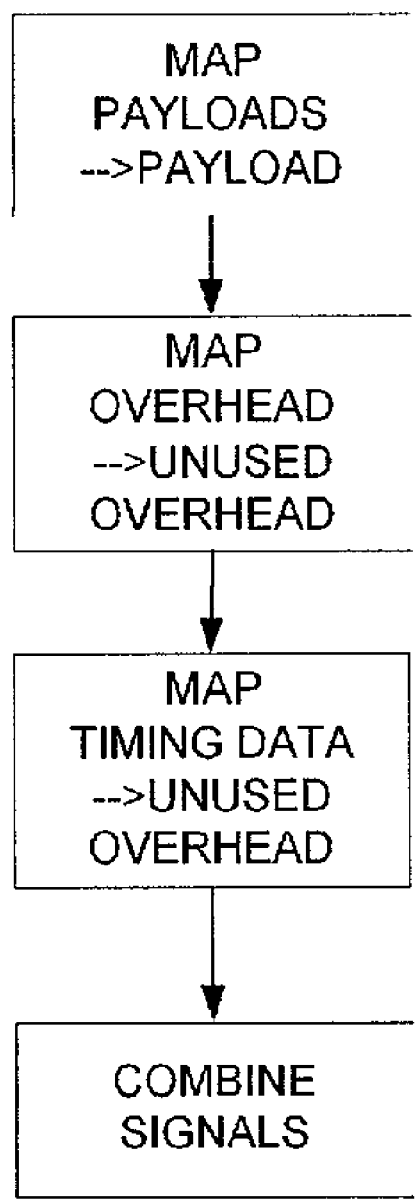
FIG. 9 is a flow diagram illustrating the manner in which the multiple low-bit-rate data streams are multiplexed into a single high-bit-rate data stream in one embodiment.
Figure 10:
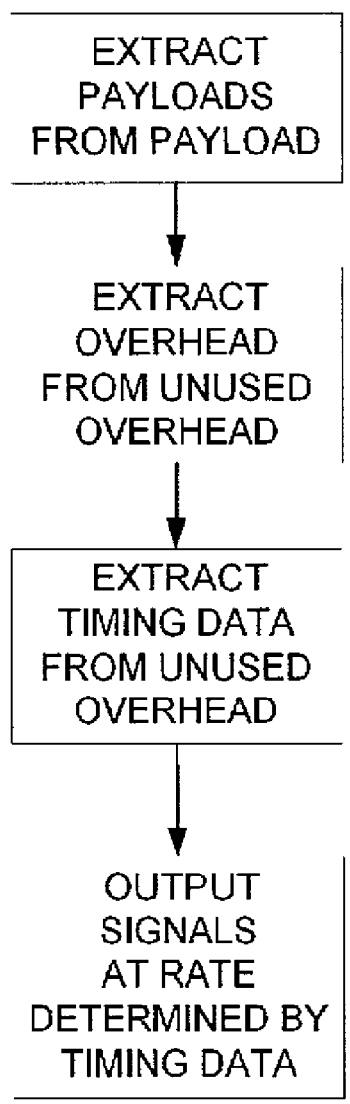
FIG. 10 is a flow diagram illustrating the demultiplexing of the data from the high-bit-rate datastream in one embodiment.

Referring to FIG. 9, a flow diagram illustrating the manner in which the multiple low-bit-rate data streams are multiplexed into a single high-bit-rate data stream in one embodiment is shown. As indicated above, the data corresponding to each of the low-bit-rate data streams is stored in a corresponding buffer until it can be added to the high-bit-rate data stream. As illustrated by FIG. 9, the data payloads of the low-bit-rate data streams are mapped to the payload of the high-bit-rate datastream, the overhead data of the low-bit-rate data streams are mapped to the unused portion of the overhead data storage of the high-bit-rate datastream, and timing information for the low-bit-rate data streams is mapped to the unused portion of the overhead data storage of the high-bit-rate datastream. It is not important that the mapping of these different types of data occur in any particular order. In the example of the SONET signals described above, the data streams comprise frames of data. Consequently, the multiplexing of the data from the low-bit-rate data streams into the high-bit-rate datastream is performed on a frame-by-frame basis. If the data streams utilize packet-type protocols, the multiplexing of the data from the low-bit-rate data streams into the high-bit-rate datastream is performed on a packet-by-packet basis. If the data streams utilize other types of formatting, the mapping of the low-bit-rate data to the high-bit-rate data will be performed in a manner appropriate for that type of formatting.

After the high-bit-rate datastream is transmitted, it is typically stored in a buffer until it can be demultiplexed and processed. Referring to FIG. 10, a flow diagram illustrating the demultiplexing of the data from the high-bit-rate datastream is shown. This process is essentially the reverse of the multiplexing illustrated in FIG. 9. It involves the extraction of the low-bit-rate datastream payloads from the payload of the high-bit-rate datastream, and extraction of the overhead associated with the low-bit-rate datastreams, as well as the timing data for each of the low-bit-rate data streams from the portion of the high-bit-rate overhead which is not used for transmission of the high-bit-rate datastream. As with the multiplexing of the data, it is not important that the extraction of the different types of data occurs in a particular order. After the data for each of the low-bit-rate data streams is extracted, the bit sequences of the original low-bit-rate data streams are reconstructed. The data for each datastream is stored in a corresponding buffer and is read out of the buffer at a rate determined by the timing information associated with that datastream.

The foregoing descriptions of the methods illustrated in FIGS. 7–10 are directed to a system operating in a virtual fiber mode. It should be noted that, in other embodiments, the system may operate in a conventional mode, in which both the bit sequence and timing of a particular low-bit-rate output datastream vary from the bit sequence and timing of the corresponding low-bit-rate input data stream.

Although not shown explicitly in the figures, the method may also include the conversion of the electrical signals generated by reading data out of the buffers (see FIG. 10) into an optical datastream. Just asked with the conversion of the original optical datastream into an electrical datastream, this conversion may be performed in a conventional manner which is well-known in the art of the invention.

Figure 11A:
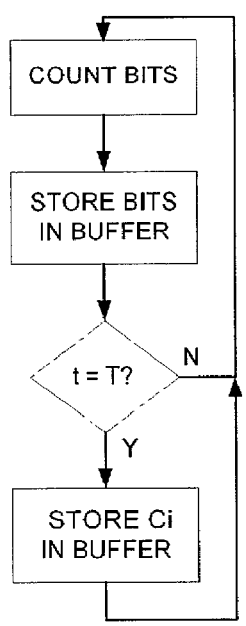
FIGS. 11A and 11B are a set of flow diagrams illustrating in more detail the manner in which the timing data corresponding to each of low-bit-rate data streams is determined in one embodiment.
Figure 11B:
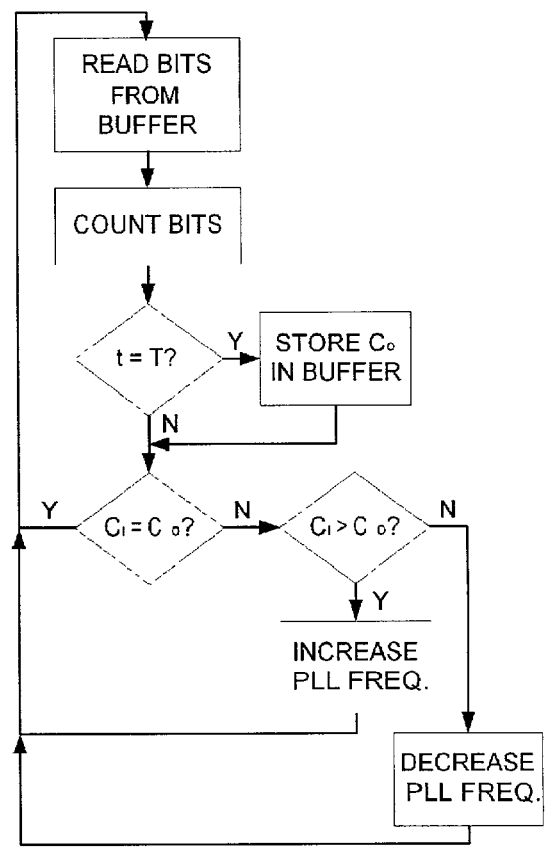

Referring to FIGS. 11A-11B, a set of flow diagrams illustrating in more detail the manner in which the timing data corresponding to each of low-bit-rate data streams is determined in one embodiment are shown. FIG. 11A corresponds to the generation of timing information as performed in the ingress module of FIG. 6A. FIG. 11B corresponds to generation of the output datastream at the same frequency as the input datastream as performed in the egress module of FIG. 6B.

In FIG. 11A, the bits of the data stream embodied in the electrical signal are counted as they are received by the buffer and are stored. At regular intervals (T), a count (Ci) of the number of bits stored in the buffer during the preceding interval is also stored. The bit count defines the rate at which the input datastream was received. This bit count is stored in the unused portion of the high-bit-rate signal overhead for transmission to the demultiplexer and egress modules.

The high-bit-rate datastream is received from the high-bit-rate transmission medium by the demultiplexer. The demultiplexer extracts the payload, overhead and timing information for each of the low-bit-rate datastreams and forwards this information to a buffer in the corresponding egress module. As shown in FIG. 11B, the data bits are read out of the buffer at a frequency determined by a phase locked loop. The bits are counted as they are read out of the buffer and, at regular intervals (T), the output bit count is stored. This output bit count is compared with the input bit count received with the data. If the bit counts match, the PLL frequency is not adjusted. If the input bit count is greater than the output bit count, the PLL frequency is increased. If the input bit count is less than the output bit count, the PLL frequency is decreased.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for transporting a plurality of client data signals via a single server signal comprising:
   receiving a plurality of input client data signals;
   generating timing data for each of the plurality of input client data signals and constructing the corresponding output client data signals,
      wherein generating the client timing data for each of the plurality of input client data signals comprises, for each input client data signal, counting the bits of the input client data signal and determining the number of bits of the input client data signal which are counted in a predetermined interval, and
      wherein constructing the corresponding output client data signals comprises, for each output client data signal, counting the bits of the output client data signal, determining the number of bits of the output client data signal which are counted in the predetermined interval and adjusting a data rate of the output client data signal to cause the number of bits of the output client data signal which are counted in the predetermined interval to match the number of bits of the input client data signal which are counted in the predetermined interval;
   mapping client payload data from the plurality of input client data signals to a payload of a server signal;
   mapping client overhead data from the plurality of input client data signals to a first portion of unused overhead data in the server signal;
   mapping client timing data to a second portion of unused overhead data in the server signal;
   transporting the server signal;
   extracting the client payload data, client overhead data and client timing data from the server signal; and
   constructing a plurality of output client data signals from the client payload data, client overhead data and client timing data.

2. A method for transporting a plurality of client data signals via a single server signal comprising:
   receiving a plurality of input client data signals;
   generating timing data for each of the plurality of input client data signals and constructing the corresponding output client data signals, wherein generating the client timing data for each of the plurality of input client data signals comprises, for each input client data signal, counting the bits of the input client data signal and determining the number of bits which are counted in a predetermined interval;
   mapping client payload data from the plurality of input client data signals to a payload of a server signal;
   mapping client overhead data from the plurality of input client data signals to a first portion of unused overhead data in the server signal;
   mapping client timing data to a second portion of unused overhead data in the server signal;
   transporting the server signal;
   extracting the client payload data, client overhead data and client timing data from the server signal; and
   constructing a plurality of output client data signals from the client payload data, client overhead data and client timing data.

3. A system for transporting a plurality of low-bit-rate data signals over a high-bit-rate data line comprising:
   a multiplexer configured to:
      receive a plurality of low-bit-rate input data signals,
      map a payload of each low-bit-rate input data signal to a payload of a high-bit-rate data signal,
      map overhead data of each low-bit-rate input data signal to unused overhead of the high-bit-rate data signal, and
      map timing data for each low-bit-rate input data signal to the unused overhead of the high-bit-rate data signal, wherein the timing data is generated at the multiplexer based on the bit rates of the low-bit-rate data signals,
      wherein the multiplexer comprises one or more ingress modules configured to generate the timing data for each low-bit-rate input data signal;
   a transmission medium coupled to the multiplexer and configured to transport the high-bit-rate data signal; and
   a demultiplexer coupled to the transmission medium and configured to generate a plurality of low-bit-rate output data signals from the high-bit-rate data signal.

4. The system of claim 3 wherein each of the ingress modules comprises
   an ingress buffer configured to store the first data stream,
   an ingress counter configured to count the bits of the first data stream which are stored in the ingress buffer,
   an ingress timer, and
   write logic coupled to the ingress counter and the ingress timer and configured to determine the data rate of the first data stream, wherein the write logic is further configured to periodically write the data rate of the first data stream into the ingress buffer.

5. The system of claim 4 wherein each of the ingress modules further comprises a converter configured to convert a received optical signal into an electrical signal.

6. The system of claim 3 wherein each of the ingress modules is configured to generate the timing data by counting a number of received bits in a predetermined interval.

7. A system for transporting a plurality of low-bit-rate data signals over a high-bit-rate data line comprising:
   a multiplexer configured to:
      receive a plurality of low-bit-rate input data signals,
      map a payload of each low-bit-rate input data signal to a payload of a high-bit-rate data signal, map overhead data of each low-bit-rate input data signal to unused overhead of the high-bit-rate data signal, and map timing data for each low-bit-rate input data signal to the unused overhead of the high-bit-rate data signal, wherein the timing data is generated at the multiplexer based on the bit rates of the low-bit-rate data signals;

a transmission medium coupled to the multiplexer and configured to transport the high-bit-rate data signal; and a demultiplexer coupled to the transmission medium and configured to generate a plurality of low-bit-rate output data signals from the high-bit-rate data signal, wherein the demultiplexer is configured to generate the plurality of low-bit-rate output data signals by generating at least one of the low-bit-rate output data signals corresponding to one of the low-bit-rate input data signals such that a payload of the at least one of the low-bit-rate output data signals is the same as a payload of the corresponding one of the low-bit-rate input data signals, and overhead data of the at least one of the low-bit-rate output data signals is different from overhead data of the corresponding one of the low-bit-rate input data signals.

8. A system for transporting a plurality of low-bit-rate data signals over a high-bit-rate data line comprising:

a multiplexer configured to:
receive a plurality of low-bit-rate input data signals,
map a payload of each low-bit-rate input data signal to a payload of a high-bit-rate data signal,
map overhead data of each low-bit-rate input data signal to unused overhead of the high-bit-rate data signal, and
map timing data for each low-bit-rate input data signal to the unused overhead of the high-bit-rate data signal, wherein the timing data is generated at the multiplexer based on the bit rates of the low-bit-rate data signals;

a transmission medium coupled to the multiplexer and configured to transport the high-bit-rate data signal; and a demultiplexer coupled to the transmission medium and configured to generate a plurality of low-bit-rate output data signals from the high-bit-rate data signal, wherein the demultiplexer is configured to generate a first low-bit-rate output data signal by reconstructing the bit sequence and timing of a corresponding one of the low-bit-rate input data signals in the first low-bit-rate output data signal, and generate a second low-bit-rate output data signal having an identical payload and different overhead data from a corresponding low-bit-rate input data signal.

* * * * *